C. C. LODER.
AUTOMOBILE SIGNAL CONTROLLING MECHANISM.
APPLICATION FILED JUNE 30, 1917.
1,389,366.
Patented Aug. 30, 1921.
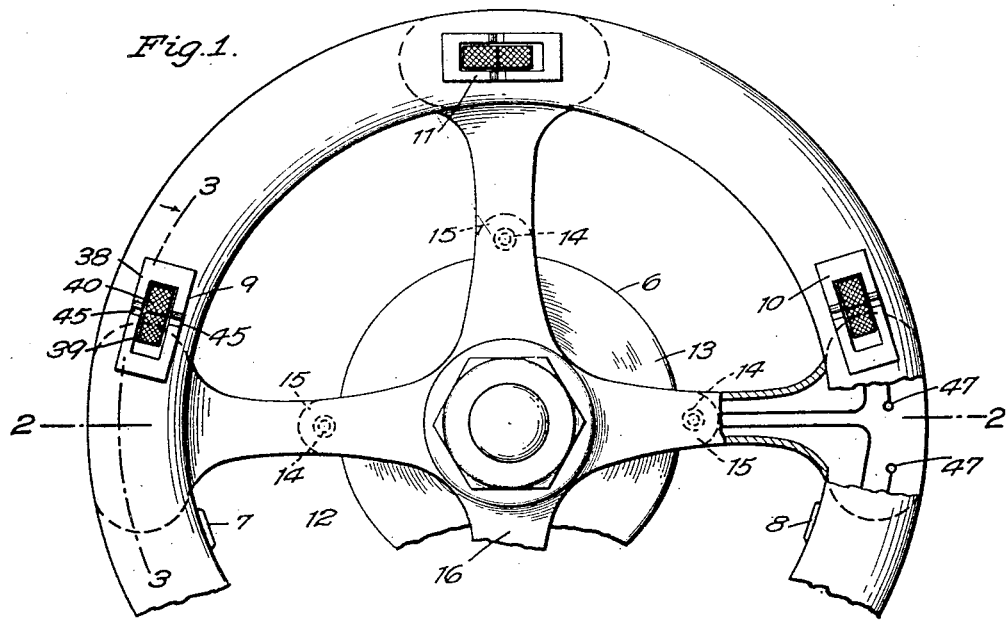
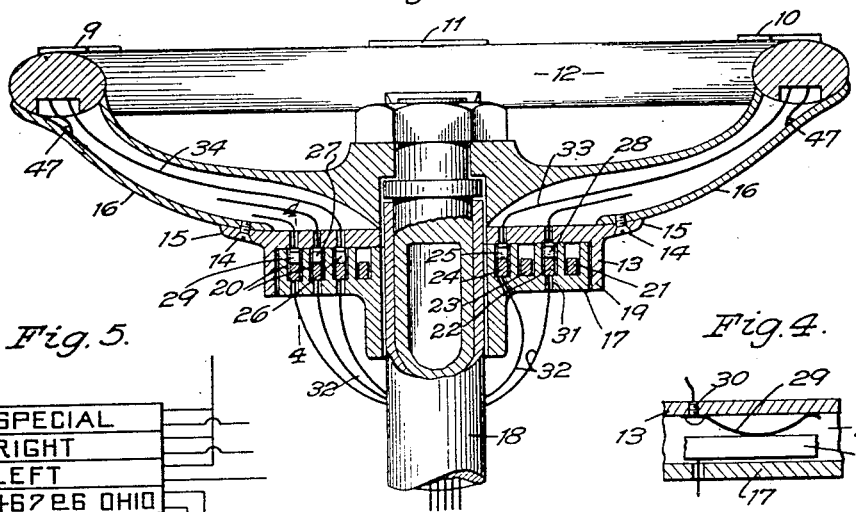
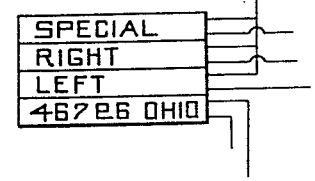
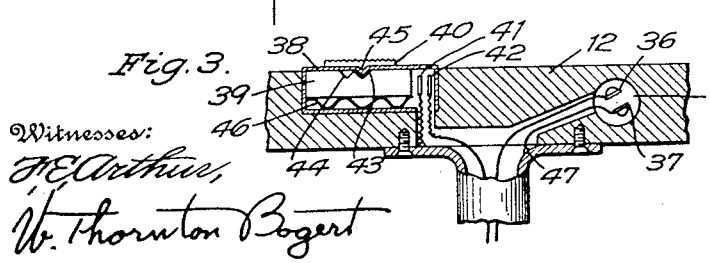

UNITED STATES PATENT OFFICE.

CHARLES C. LODER, OF CINCINNATI, OHIO.

AUTOMOBILE SIGNAL-CONTROLLING MECHANISM.

1,389,366.     Specification of Letters Patent.     Patented Aug. 30, 1921.

Application filed June 30, 1917. Serial No. 177,986.

*To all whom it may concern:*

Be it known that I, CHARLES C. LODER, citizen of the United States of America, and resident of Cincinnati, in the county of Hamilton and State of Ohio, have invented a new and useful Improvement in Automobile Signal-Controlling Mechanisms, of which the following is a specification.

An object of my invention is to produce an improved signal controlling mechanism for automobiles, in which the necessity of removal of the operator's hands from the steering wheel, to operate a signal sending mechanism, is overcome.

A further object is to produce an improved signal controlling mechanism which is mounted upon the steering wheel of an automobile in a manner and position such that the operator's comfortable grasp of the steering wheel is not changed and in which the natural movements and positions of the hands in operating the steering wheel, are employed in the proper operation of the signal controlling mechanism.

A further object is to produce an improved signal controlling mechanism in which movement of the steering wheel to different positions, is free, although certain elements of the signal controlling mechanism are mounted thereon.

These and other objects are attained in the signal controlling mechanism described in the following specification and illustrated in the accompanying drawing, in which;

Figure 1 is a fragmental plan view of a steering wheel having mechanism embodying my invention mounted thereon.

Fig. 2 is a sectional view taken on the line 2—2 of Fig. 1.

Fig. 3 is a fragmental sectional view taken on the line 3—3 of Fig. 1.

Fig. 4 is a fragmental sectional view taken on the line 4—4 of Fig. 2.

Fig. 5 is a somewhat diagrammatic view of a signal indicating device adapted to be located at the front and rear of the automobile.

My improved signal controlling mechanism consists of a contact mechanism 6 adapted to permit rotary movement of the steering wheel, push buttons 7 and 8 adapted to control the horn of the automobile, shifting buttons 9, 10 and 11 adapted respectively to control the left direction indicating signal, the right direction indicating signal, and the special signal such as one indicating a doctor's car, etc.

Contact mechanism 6 is located beneath the steering wheel 12 of the automobile and consists of a superimposed hard rubber or fiber cup-shaped member 13 secured to the under side of the steering wheel by means of a series of screws 14 located in lugs 15 extending from the cup-shaped member and secured to the arms 16 of the steering wheel, and a hard rubber or fiber subjacent member 17 which is secured to the steering post 18 of the automobile and which is located within a depending flange 19 formed on member 13. Member 17 is provided with a series of annular grooves 20 in which are located a series of metal rings 21, 22, 23 and 24 which lie on the bottoms of grooves 20. Grooves 20 are of such a depth that rings 21 to 24 inclusive occupy but a portion of the depth thereof. Secured to the under side of cup-shaped member 13 are a series of springs 25, 26, 27, 28, 29 which are adapted to engage the respective rings 24, 23, 22 and 21. Each of the springs 25 to 29 inclusive are of the shape disclosed in Fig. 4 in which one end is secured by means of a screw stud 30 to cup shaped member 13 and the other end is free to yield when pressed into engagement with the rings. At a suitable point beneath each ring an opening 31 is provided for the passage therethrough of a wire 32 to which the signal indicating device illustrated in Fig. 5 is connected. Each screw stud 30 of each of the springs is connected with a wire which connects it with its proper one of the push and shifting buttons. Push buttons 7 and 8, both being connected with the horn, are located in the same circuit and for this reason employ but one ring 22 upon which springs 27 and 28 bear. Shifting button 9 is shown in the drawing as being connected with spring 26 and thence through ring 23 to its proper element of the signal indicating device, by means of a lead wire 34. Shifting button 10 is connected with the spring 25 and thence through ring 24 to its proper element of the signal indicating device, by means of lead 33. Shifting button 11 is connected with spring 29 and thence through ring 21 to its proper element of the signal indicating device by means of a lead 35. The push buttons and shifting buttons are connected with their respective leads in the manner illustrated in Fig. 3, the terminals 36 and 37 of push button 7 being disclosed in this figure. Each of the shifting buttons is constructed in the same manner as shifting button 9 disclosed in longitudinal section in Fig. 3 in which a casing 38 is shown sunken into the steering wheel rim and as being provided with a shifting block 39 having a corrugated finger piece 40 extending above the casing for manual reciprocation of the block. When in the position disclosed in Fig. 3, the circuit of that element of the signal indicating device connected with this shifting button is broken, but when the block 39 is moved toward the opposite end of the casing a pair of contacts 41 and 42 are brought into engagement with one another to complete a circuit to its element of the signal indicating device. For the purpose of retaining shifting block 39 in either of these positions I have provided a pair of notches 43 and 44 which are adapted to coöperate with a detent 45 formed in the casing, in such a manner that when in the circuit breaking position detent 45 occupies notch 43 and when in the circuit making position detent 45 occupies notch 44. In order to maintain shifting block 39 in either of the positions it is adapted to occupy, I have provided a spring 46 located between it and the bottom of casing 38 so that it may be pushed down to permit it to be moved from one end to the other to bring either of its notches 43 or 44 into position to be engaged by detent 45. In the drawings I have shown one branch of the circuit leading from each push and shift button as being grounded at points 47 upon the metal portion of the steering wheel and thence through the frame of the machine, thus eliminating a number of wires in the wiring of the circuits leading to the indicating device illustrated in Fig. 5. The normal position of the operator's hands upon the steering wheel is adjacent to the ends of the transverse diameter of the wheel in its straight ahead position. The horn operating push buttons 7 and 8 are mounted upon the inner periphery of the steering wheel, adjacent to the normal positions of the operator's hands, so as to be readily accessible to his little fingers. The shifting buttons 9 and 10 are located upon the upper surface of the steering wheel, adjacent to the normal position of the operator, so as to be readily accessible to his thumbs, the button 9 being in position such that it is moved in drawing the hand toward the operator, such as is used in turning the machine to the left, and the button 10 is mounted so as to be moved, when the hand is drawn toward the operator, such as is done in turning the machine to the right. Upon bringing the steering wheel back to its normal position, the tendency in either case would be for the thumb to move block 39 back to its inoperative or circuit breaking position. The shifting button 11 is located at the top of the steering wheel and is adapted either to occupy an "on" or an "off" position since the special signal which it controls is intended to be illuminated continuously until its illumination is no longer desired. The device for indicating the signals is constructed in any suitable manner such that each element thereof will become illuminated upon proper operation of the push or shifting button connected with it. Since the electrical connections and manner of illuminating the separate elements of the signal indicating device, form no portion of this invention, detailed disclosure thereof is omitted.

Having thus described my invention, what I claim is:

1. A contact device for automobile signal controlling mechanisms adapted to be located on a steering wheel in position to be accessible to the shifting movement of the thumbs of the operator, said device consisting of a casing, contacts within the casing and a shifting block located within the casing, adapted to be shifted by the operator's thumbs in directions substantially concentric with the periphery of the wheel, whereby the contacts may be engaged and disengaged.

2. A contact device for automobile signal controlling mechanisms adapted to be located on a steering wheel in position to be accessible to the shifting movement of the thumbs of the operator, said device consisting of a casing mounted on the steering wheel, normally disengaged contacts within the casing, a shifting block movably mounted within the casing adapted to be shifted so as to move the contacts into engagement with one another, and means within the casing adapted to yieldably maintain the block in a shifted position, the block being accessible to the thumbs of the operator.

In testimony whereof, I have hereunto subscribed my name this 28th day of June, 1917.

CHARLES C. LODER.

Witnesses:
WALTER F. MURRAY,
W. THORNTON BOGERT.